(12) United States Patent
Berthier et al.

(10) Patent No.: US 6,335,624 B1
(45) Date of Patent: Jan. 1, 2002

(54) PROCESS FOR ELECTROMAGNETIC DETECTION OF CONDUCTING OBJECTS

(75) Inventors: Jean Berthier, Meylan; Francis Robach, Blviers; Pascal Manet, Fontaine, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/580,584

(22) Filed: May 30, 2000

(30) Foreign Application Priority Data

Jun. 2, 1999 (FR) .................................... 99 06950

(51) Int. Cl.$^7$ ....................................... G01V 3/08
(52) U.S. Cl. ......................... 324/326; 324/329; 324/336
(58) Field of Search ..................... 324/336, 326, 324/329, 337, 345, 239, 202; 702/40, 106, 134

(56) References Cited

U.S. PATENT DOCUMENTS

| | | |
|---|---|---|
| 3,950,695 A | 4/1976 | Barringer |
| 4,896,116 A | 1/1990 | Nagashima et al. |
| 5,159,343 A | 10/1992 | Harmuth |
| 5,654,637 A | 8/1997 | McNeill |

FOREIGN PATENT DOCUMENTS

| | | |
|---|---|---|
| FR | 2753280 | 3/1998 |
| WO | WO92/19989 | 11/1992 |
| WO | WO98/08106 | 2/1998 |

OTHER PUBLICATIONS

Daniel Euvrard, "Résolution numérique des équations aux dérivées partialles", de la physique, de la mécanique et des sciences de l'ingénieur , Différences finies, éléments finis, méthode des singularités.

G.J. Heald, et al. "A Review of Underwater Detection Techniques and Their Applicability to the Landmine Problem," Controller HMSO London 1998, pp. 173–176.

Allen Taflove, "Computational Electrodynamics: The Finite–Difference Time–Domain Method," pp. 281–289, 1995 Artech House, Inc.

Oszkar Biro, et al. "On the Use of Magnetic Vector Potential in the Finite Element Analysis of Three–Dimensional Eddy Currents", IEEE Transactions on Magnetics. vol. 25. No. 4. Jul. 1989, pp. 3145–3159.

Edited by Milton Abramowitz , et al. "Handbook of Mathematical Functions with Formulas, Graphs, and Mathematical Tables," Issued Jun. 1964, Fourth Printing, Dec. 1965, with corrections.

*Primary Examiner*—Safet Metjahic
*Assistant Examiner*—Subhash Zaveri
(74) *Attorney, Agent, or Firm*—Burns Doane Swecker & Mathis LLP

(57) ABSTRACT

A process is described to detect conducting objects buried in the ground by sending a series of electromagnetic pulses and the return signal. The signal characteristics stored in the database are sets of numerical data which each define characteristics of decreasing curves of the values of previously-received signals then, in a search phase, the numerical values of samples ranked 1, 2, . . . n are recorded, representing a real decreasing curve of a received signal. The average real decreasing curve is created by determination of the average value of the samples, each of which represents the average value of the values of the samples of the same rank. A value representing the difference between the set of characteristics of the real average decreasing curve and each of the sets with the same database characteristics is calculated. The smallest of the differences is compared with the threshold value. There is detection if at least one difference is less than the predetermined threshold, the object and its burying depth being defined as the object in the database which had the minimum difference value.

7 Claims, 2 Drawing Sheets

PROCESS FOR ELECTROMAGNETIC DETECTION OF CONDUCTING OBJECTS

FIELD OF THE INVENTION

This invention is in the field of detection of electrically-conducting objects buried at shallow depths in the ground, in particularly under the sea, by active electromagnetic induction.

The invention can be applied in particular to the detection of underwater mines laid near coasts in relatively shallow water. Most of the time, due to their weight and the action of waves and tides, these mines are buried in coastal sediment and sands.

Another example is for archaeological research for metallic debris buried over the course of time in the sands and sediments of sea and river beds.

TECHNOLOGICAL BACKGROUND

Classic NMR magnetometry methods can be used to locate shallow-buried magnetic objects in some cases. Their limitations are due to surrounding noise, false alarms due to any other magnetic objects as well as the strong signal decrease with distance.

Acoustic detection techniques (sonar) developed for the same type of ground applications are not very effective in the sea [1] because, if high frequencies are used, the attenuation of the waves is very great in the sea and in sediments saturated with water. If low frequencies are used, the instrument's directivity is low and there are many interfering echoes from the roughness of the sea bed and the sediment geology which mask the "useful" signal.

Classic radar detection techniques [2] GPR (ground penetrating radar) are not effective because of the high absorption of high frequency electromagnetic waves by the water layer and by sediments saturated with water.

It is often impossible to detect these objects by optical methods because they are buried or—even if the objects are not totally buried—because of the turbidity of the sea bed, particularly in coastal areas, due to waves and swell.

Active electromagnetic methods have recently been developed for detection of these types of objects. The following paragraph explains the principle of these methods, examples of existing patents, and their limitations.

The detection principle is based on electromagnetic induction. More precisely, pulses of current circulating in a transmitting antenna induce Foucault currents which are concentrated in the most conducting parts of the ground—particularly in the objects to be detected. Once the current is cut off in the transmitter antenna, the induced currents then provoke an electric current in the receiving antenna by induction. The principle is thus to electrically charge the inhomogeneous conducting elements in the soil which then transmit some of this energy to the receiving antenna. The response signal to the receiving antenna is then analysed to diagnose the presence or absence of a metallic object or electrical conductor. FIG. 1 provides a diagram of the electric current when the transmitting antenna also acts as the receiving antenna.

In this figure, the current pulses emitted by the antenna are shown by full lines, The shape of the return signal received is shown by the dotted line having the shape of the dotted line b when there are no buried metal objects and dotted line c when an object is buried. The return signal received is of a higher level in this case.

An example of the use of such a process is described in the patent U.S. Pat. No. 5,654,637 awarded to GEONICS [3] entitled "Method for detecting buried high conductivity objects including scaling of voltages for eliminating noise of a particular depth". This patent describes an electromagnetic pulse system to detect metallic objects in the ground. The operating principle is that explained above: electrical current pulses induce currents in the metallic object to be detected. The reception antenna system is made of two horizontal antennae located along the same vertical line. This system reduces noise and gives an estimation of the depth of the object.

This patent is intended for applications for searching for metallic objects and parts in the ground. It is not directly applicable to "hostile" media such as the sea, because the response signal recorded by the second loop (second receiving antenna) is too weak due to absorption of the field by the sea water.

Another example of the use of such a process is described in the patent application WO 98/08106 of February 1998 by KELLER [4] entitled "non obtrusive weapon detection system and method for discrimination between a handgun and other metal object". This is used for detecting weapons carried by people at airports.

The principle of the system is the same: a current-carrying transmitter induces electric current in the object to be detected. Rapid magnetic sensors then register the time response. The time constant characteristic of the decrease in the response allows for differentiation of various metallic objects which people may be carrying in public places. The measured value of the time constant is compared with constant values listed in a database.

The process described in this patent rightly assumes that the position of the object with respect to the antenna loop is known. It is only concerned with the time constant of the decrease.

Such a process is not applicable to objects of unknown shapes located at unknown distances.

There is also the patent application [5] of P. ELLIOT No. WO 92/19989 of November 1992 entitled: "Airborne transient electromagnetic method with ground loops". This patent application is mainly intended for applications such as petroleum prospecting because it describes a device with a very large transmitter and an airborne receiver.

This patent application [5] focuses particularly on geology and geophysics: the dimensions are too large to detect mine-sized objects. Furthermore, the system cannot work in a marine environment.

The state of the art which has just been described shows that when the media where the transmission and reception antennae are placed are poor conductors, the systems and processes of the prior art do not work. For the sea in particular, as sea water is conducting, much of the energy supplied is dissipated in the marine environment and only a small part constitutes the "usable" signal. A much more sensitive system must therefore be used, allowing for processing of the signal for detection analysis.

BRIEF DESCRIPTION OF THE INVENTION

According to the invention, in an initial phase a database including the complete temporal response or only certain values characteristic of this response for any three-dimensional conducting objects with a shape similar to that of the objects sought is generated. For example if it is a sea mine, the temporal response of an object with exterior conducting parts corresponding to that of the mines sought is calculated or measured during a test campaign. Then, during a search phase:

a series of electromagnetic pulses is transmitted by an antenna in the form of at least one loop for each pulse, the temporal response received in return by a receiving antenna is recorded, an average temporal response is created by taking the average of the various responses received. Some of the distortions of the individual curves due to electromagnetic noise of the sea which is relatively substantial due to the weakness of the signal are thus eliminated.

The processing of the average decreasing curve to identify the presence of a object sought, its nature and its location can then be approached in several ways. These involve comparing the characteristics of the average decreasing curve with the same characteristics of various decreasing curves obtained in a previous phase. The inventors determined that the probability of a false alarm by comparison solely with the time constant, as in the method described in the patent request already cited [4], was too high in marine media.

In a first form of the processing, the selected characteristics of the average decreasing curve are composed of the level values of the signal received, at the moments of sampling of this signal, these characteristics thus forming an average real decreasing curve. According to this first type of processing:

a value representing the difference between the average real decreasing curve and each of the decreasing curves of the pre-recorded digital signals is calculated, the smallest of the values representing the difference between the average real decreasing curve and each of the pre-recorded decreasing curves is compared with a threshold value, there is detection if at least one value representing a difference between this average decreasing curve and one of the pre-recorded decreasing curves is less than a pre-determined threshold, the object and its buried depth being defined as the object from the database which gave the value of the minimum difference.

In a second type of processing, the selected characteristics of the average decreasing curve are composed of measured or calculated characteristics which define certain aspects of this curve. These characteristics are compared with the same characteristics of various decreasing curves obtained in a prior phase. This second type of processing has, with respect to the first, the advantage of reducing the size of the database, because only the characteristics of each curve within the selected set are stored. This also allows for more rapid processing.

In its first embodiment, the invention thus involves a process for detection and localisation of electrically-conducting objects buried in the ground, the process involving the sending of a series of electromagnetic pulses into the medium to be explored by means of a transmitting antenna with at least one loop, and comparing a return signal received on a receiving antenna having at least one loop, with at least one signal characteristic stored in a process database characterised in that:

the characteristics of the signals stored in the database are composed of numeric data which each define, in the temporal domain, the shape of a decreasing curve of the value of the signals received in a phase prior to the search, by a first receiving antenna for formation of the database, above ground in which an object is buried and which has an exterior conducting shape identical or similar to an object sought, for various sizes and object depths, after transmission of signals by a first transmitting antenna for formation of the database, and then in the search phase, the numerical values are periodically recorded for the samples of rank 1, 2 . . . n, together representing a real decreasing curve of a signal received by a detection receiving antenna having the same shape and orientation as the receiving antenna used to create the database, this signal being received after transmission by a real antenna having the same shape and orientation as the transmitting antenna which was used to form the pre-recorded characteristics, an average decreasing curve of an average signal received is created by determination of average sample values, each of which represents the average value of the values of samples of the same rank, a value representing the difference between the real average decreasing curve and each of the decreasing curves of the pre-recorded digital signals is calculated, the smallest of the values representing a difference between the real average decreasing curves is compared with each of the pre-recorded decreasing curves, there is detection if at least one value representing a difference between this average decreasing curve and one of the pre-recorded decreasing curves is below a given threshold, the object and its buried depth being defined as the object of the database which had the minimum difference value.

In its second embodiment, the invention involves a process for detection and localisation of electrically-conducting objects buried in the ground, the process involving the sending of a series of electromagnetic pulses into the medium to be explored by means of a transmitting antenna with at least one loop, and comparing a return signal received on a receiving antenna having at least one loop, and at least one signal characteristic stored in a process database characterised in that:

the characteristics of the signals stored in the database are composed of points in a space of N dimensions, N being a whole number greater than or equal to 1, the dimensions representing the characteristic values of a decreasing curve over time of the value of the signals received in a phase prior to the search, by a first receiving antenna for formation of the database, above ground in which an object is buried which has an exterior conducting shape which is identical or similar to the object sought, for various sizes and depths of the object, after transmission of pulses by a first transmitting antenna for formation of the database, and a detection volume is demarcated in the space in N dimensions, this volume being demarcated by a surface enveloping all points contained in the database, then, during a search phase, numerical values of samples of rank 1, 2 . . . n are periodically recorded which together represent a real decreasing curve of a signal received by a detection receiving antenna having the same shape and orientation with respect to the ground as the receiving antenna which was used to create the database, this signal being received after transmission by a real antenna having the same shape and the same orientation with respect to the ground as the transmitting antenna which was used for formation of the pre-recorded characteristics, an average decreasing curve is created for an average signal received by determination of the average sample values, each of which represents the average value of the values of samples of the same rank, on the average decreasing curve, the same characteristic values as those recorded in the database are determined, the point corresponding to the real curve obtained is situated in the N-dimension space of the database, there is detection if the point of the real curve obtained is within the detection volume, the position and the nature of the object being determined as a function of the neighbouring points in space.

BRIEF DESCRIPTION OF THE DRAWINGS

The invention will now be described with regard to the appended drawings, in which.

DESCRIPTION OF A DETAILED EMBODIMENT

Figure 1:
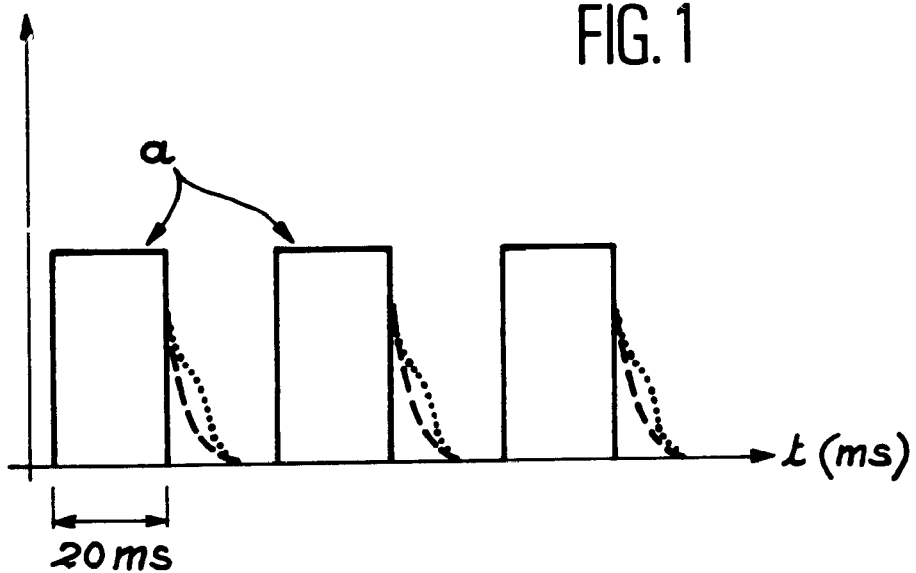
FIG. 1, already described, shows the shape of the detection pulses emitted as well as the temporal response to these pulses, FIG. 2 schematically represents a device to function according to the invention process.
Figure 2:
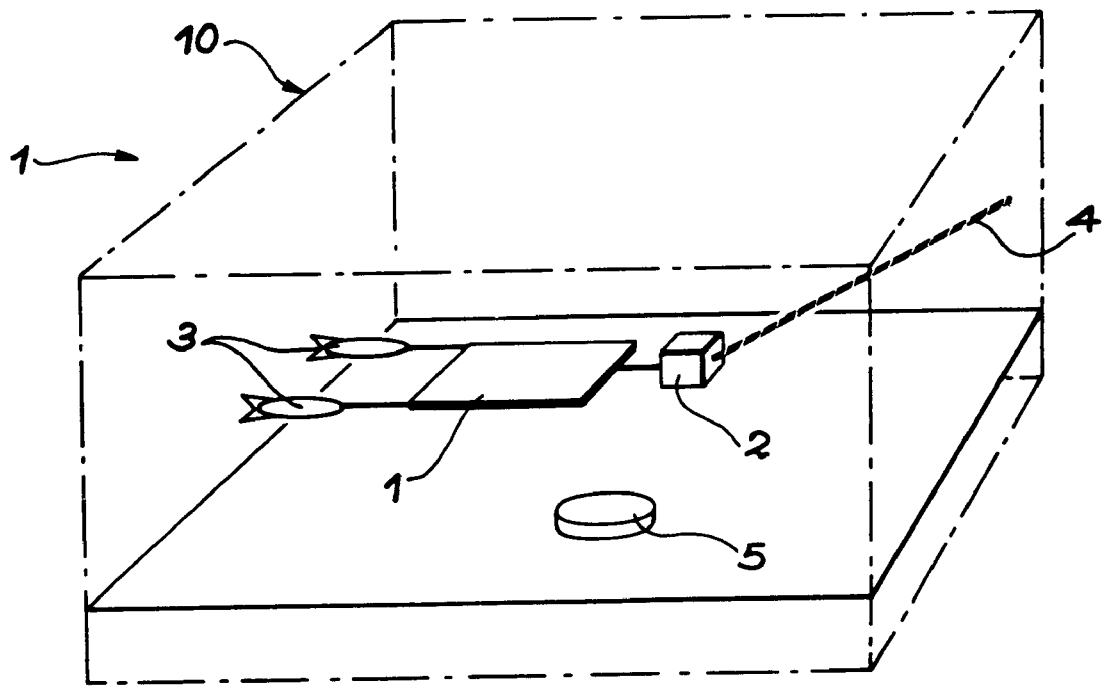

A device 1 to function in a marine environment 10 according to the invention process is shown in FIG. 2. The device includes an antenna 1 coupled to an electronic measurement box 2. The distance from the antenna 1 to the bottom surface of the marine environment 10 is maintained essentially constant, on the order of 50 cm for example, with stabilisers 3. The set including the stabiliser 3, antenna 1, and electronic measurement box 2 is pulled by a cable 4, by means which are not shown.

The box 2 is watertight and contains the power supply. The antenna 1 is composed of one or several loops of electrically-insulated copper. In the example shown, the antenna is both transmitting and receiving and is composed of a single rectangular loop. The dimension of the loop is on the order of the dimension of the objects 5 to be detected. This allows for maximum induction coupling between the antenna and the object.

The best coupling can be obtained in a known manner when the mutual inductance between the antenna and the object is at a maximum. The possible investigation depth is then on the order of 3L where L is the characteristic dimension of the antenna. In the experimental embodiment, the antenna was made of a square loop. In this case L is equal to the side of the square. One of the advantages of the invention is the possibility of using the receiving antenna arranged as desired as a function of the objects sought. There is theoretically no constraint on the shape or position of the receiving antenna. The only constraint is that the real antenna which is used during the search phase must have the same shape and the same orientation as the antenna used to generate the database. This could be a fictitious antenna used for calculation of the database data. It could also be a real antenna if the data were obtained experimentally. Several approaches are possible.

The simplest is to use the transmitting antenna as the receiving antenna after the cutting off of the electric current in this antenna. This approach is shown in FIG. 2.

Two horizontal loops located one above the other could also be used as in the case of document [3]. This yields a vertical gradient of the captured signal allowing for confirmation of the depth of the object. Although the second signal is weak due to the absorption of the electromagnetic field by the sea water as mentioned above with regard to the "Geonics" patent, the signal is usable in the case of the invention because the noise is eliminated by calculation of an average signal, as mentioned above.

A horizontal loop in a figure eight could also be used to eliminate certain specific noise such as that due to movements of the transmitting and receiving antennae. The device described above is used to do searches according to one of the processes indicated in the brief description of the invention. The database is created either by experimentation or by calculation.

Figure 3:
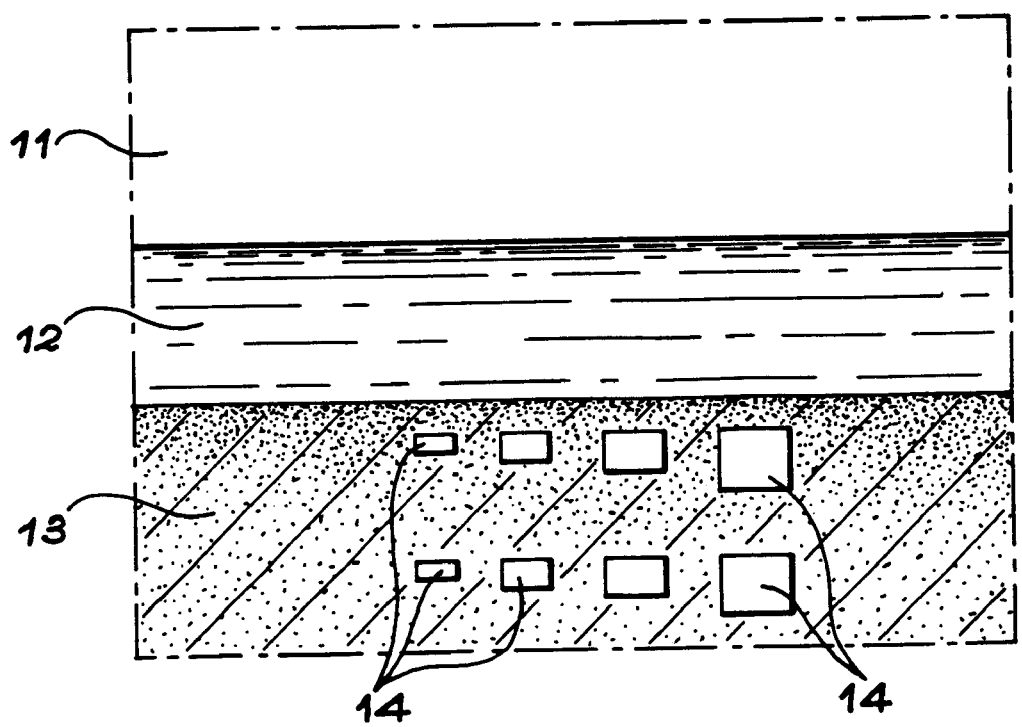
FIG. 3 symbolises various shapes and depths of real or fictitious objects to form an experimental base or by calculation of a database.

When the database is created by experimentation, known objects identical to those sought are buried in the ground at known locations and in known positions and the return signals received are recorded. Average recordings are calculated in the same conditions as those which will be used during the search phase. When the database is created by calculation, the same procedure is used, but the transmissions and receptions, the antennae and the objects are fictitious and defined by calculation. Indications regarding the calculation mode will be given below. In both cases, a database is established for a type of object, for example an underwater mine. The object or a conducting shape representative of the object is really or fictitiously buried at various depths and in various positions as shown by way of example in FIG. 3. This figure shows a section of the volume where the objects are buried in the ground, by a vertical plan. In this figure, 11 indicates the air layer, 12 the sea water layer and 13 the ground of the sea bed. Objects 14 of various sizes and shapes which are representative of the objects sought are buried sufficiently far from each other so that there is no magnetic influence between them or together on the detection antennae.

If the first type of processing of received signals is used during the search phase, the average values of the samples which together form a real decreasing curve are stored for each of the places and each of the positions where the objects were buried.

If the second type of processing of received signals is used during the search phase, the characteristic values chosen for each average curve are calculated and the N-dimension space is determined. In a preferred embodiment of this second mode, four characteristics are selected. These are: the reception time, the maximum level of the signal received, the slope of a median part of the curve for which the decrease is essentially linear and the decrease time constant of the decrease. These four characteristics are situated in a four-dimensional space. In a variant according to the noise level, only one, two or three of these characteristics could be used to form a one, two or three-dimensional space.

The reception time, i.e. the difference between the end of the transmission and the reception of a signal of a significant level, gives an idea of the position of the object with respect to the receiving antenna.

The maximum level of the signal received is an indication of the size and the conductivity of the object.

The slope of the median part of the curve is quite representative of the object's conductivity.

The time constant of the decrease allows for a correlation between the various characteristics mentioned above.

In the four-, or according to the variants, three-, two-, or one-dimensional space thus created, a detection volume is demarcated, this volume being demarcated by a surface which envelops all of the points contained in the database, the point corresponding to the real curve obtained is situated in the four-, three-, two-, or one-dimensional space of the database, there is detection if the point of the real curve obtained is within the detection volume, the position and the nature of the object being determined as a function of the neighbouring points in space.

Figure 4:
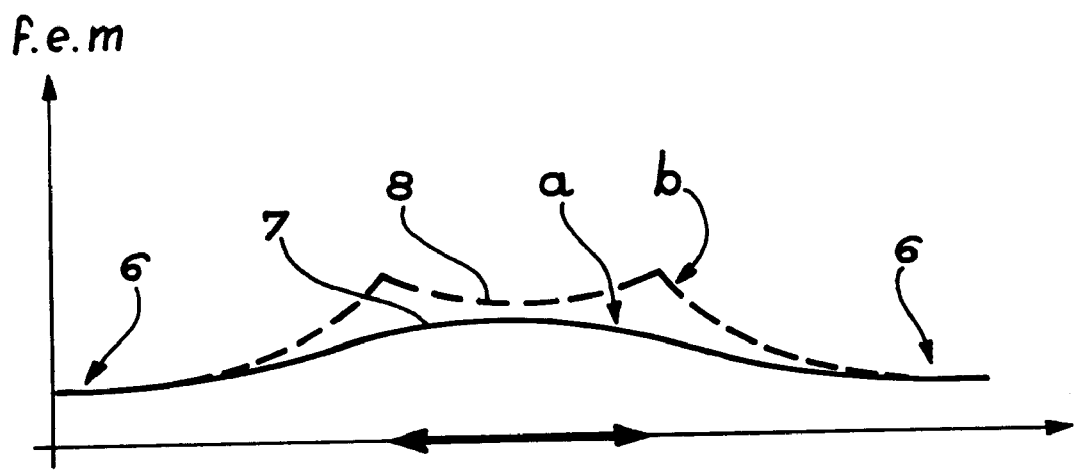
FIG. 4 represents curves for which the ordinate gives the value of the maximum power of the temporal response during a scan above the ground.

In one or the other of the modes for processing of signals captured by the receiving antenna, the possible presence of an object sought can also be confirmed by examination of the variation of the maximum power of the signal detected. When the detection system moves, this maximum increases as it gets closer to the object, with a possible plateau if it is directly above the object, then it decreases. By sweeping a zone then, a three-dimensional sweeping space can be numerically created, two dimensions representing the coordinates of the antenna and a third dimension representing the maximum power of the average curves created by processing of the signals received. In this sweeping space, the various points composed of the two coordinates of the geographic position and the maximum power of the average curves define a surface of which the peaks define the coordinates of the buried objects. FIG. 4 shows the shape of the curve representing the maximum power of the average curves during a rectilinear displacement passing close to a buried object materialised by a thick double arrow on the axis of the abscissas. The curve designated "a" on this figure represents the variation of the electromotor force present in the antenna when the trajectory is sufficiently close to the object that there is a detection, but a relatively distant one. Curve "a" has zones 6 which correspond to points which are too far from the object for detection of a significant signal, zone 7 represents a zone of detection in which the signal increases when approaching the object, passing by a maximum closest to the object, and decreasing until reaching a non-detection zone 6. The curve designated "b" on FIG. 3 and drawn with a dotted line represents the variation of the electromotor force present in the antenna when the trajectory is very close to or even above the object. It is the same as curve "a" in zones 6. In the detection zone the signal is obviously stronger. The curve has quasi-plateau 8 immediately above or very close to the object.

It was indicated above that the database used for evaluation of the signals detected could be created by the calculation. Indications for the calculation of this database will now be given.

The database is obtained by specific three-dimensional (3D) software developed for this purpose. As the goal is the most accurate calculation possible, the software is three-dimensional (3D) and uses the finite element formula. In this formula, the specific shape of the objects can be taken into account in a finite manner, while this is not the case for methods with finite differences, such as the FDTD method ("Finite-Differences Time-Domain") which treats the objects as cubes or rectangular parallelepipeds [6].

This software resolves the Maxwell equations in 3D in the temporal domain by a finite element method. These equations are expressed in Helmholtz form because only the diffusive system which is established a few micro-seconds after the end of the impulsion is of interest. The basis of the program is the temporal electromagnetic equation formulated in magnetic vector potential A and electric scalar potential Φ:

$$curl\left(\frac{1}{\mu} curl \overline{A}\right) - grad\, \eta div\, \overline{A} + \sigma \frac{\partial \overline{A}}{\partial t} + \sigma grad\phi = \overline{J}_s$$

Helmholtz equation $$div\left(\sigma \frac{\partial \overline{A}}{\partial T} + \sigma grad\, \phi\right) = 0 \quad \text{conservation du courant}$$

conservation of current (1)

The first equation is a vectorial equation and the second equation is scalar. It reflects the conservation of electric current. Js is the current source which is only present in the transmitting loop during the current pulse. A and Φ are magnetic vector and electric scalar potentials. The use of potentials A and Φ was chosen for reasons of continuity: they are continuous over the whole domain even when the electromagnetic properties of different regions of the domain are different. In addition, the signal to be modelled being in this example the electromotor force on the receiving antenna, the magnetic vector potential A need only be integrated on the contour of the receiving loop. A penalty term (the second in the Helmholtz equation) was added to the first equation to restrict the magnetic vector potential A to have zero divergence (Coulomb gauge). In addition, this penalty term improves the conditioning of the matrix which is characteristic of the system by bringing together the rotational of the first equation with a Laplace operator, if the penalty is judiciously chosen as a function of the magnetic permittivity of the medium.

In addition, to make the matrix system symmetrical, an auxiliary function W was introduced, defined by [7]

$$\Phi = \partial W / \partial t$$

The system (1) can be written schematically:

$$L[u(x,t)] = f(x,t)$$

when L is a differential operator, x the space variable and u the unknown. In this case u is the vector (Ax, Ay, Az, W).

The equations of the system (1) were then adapted to the finite elements formula. To do this, the variational principle [8] is first used. This involves projecting the partial derivative equations on a set of weighting functions (·ⱼ–1, n), which generates the vectoral space.

Also, the unknown function u(x) is interpolated on a matrix composed of elements (containing the calculation modes) by means of interpolation functions (aj, J=1,n).

$$u(x) = \sum_{j=1}^{n} a_j(x) u_j$$

To obtain the best possible results, the interpolation functions are second degree polynomials (second order method).

As operator L is linear, U and L(u) belong to the same vector space. Identical weighting and interpolation functions (Galerkine method) can thus be chosen. This yields a linear system of 4×n equations with 4×n unknowns which can be written as:

$$[\cdot]\{u\} = \{S\} \qquad (3)$$

· is the matrix of the "matrix" integration coefficients and S the vector of the "vectorial" integration coefficients.

The matrix · is very hollow, because the terms are non-zero unless the nodes defined by their indices of line i and column j belong to the same element. More precisely, the matrix system, in the temporal domain, is written with indication of the unknowns and the sources:

$$[M \cdot t + L]\{A, W\}_{n-1} = [L]\{A, W\}n + \{K_s \cdot t\} \quad (4)$$

where ·t is the time increment and $K_s$ the vector of the sources: in (4) the time-dependent terms are separated from the terms which do not vary with time.

The integration coefficients must then be evaluated numerically to form the matrix system. These integration coefficients are evaluated by the Gauss-Legendre method [9].

Lastly, the resolution of the matrix system (inversion) occurs by the LU decomposition method (Lower-Upper) The time increment ·t must be adapted to the transient: very small for high current variations, larger when the transient is less and still larger to obtain a permanent system during the current pulse. The smallest value cannot be used throughout the calculation because the calculation would be too long. The time increment is thus varied by levels, which offers the advantage of keeping the system inverting matrix (4) constant on a given level. A LU-type inversion, although it takes a long time, resolves the system on a level by simple multiplication by the inverse matrix.

The numeric method can be summarised:
starting with the Helmholtz-Maxwell equations
a second order Galerkine projection is done
the integration coefficients are formed
the integration coefficients are numerically evaluated
the matrix system is formed
the system is resolved by calculation of the inverse matrix by LU-type inversion.

For reasons of simplicity, the matrix system to be inverted was included in the Flux-Expert resolution system [10], which provides a practical framework for this approach.

Appendix
List of References Cited
[1] G. J. Heald, H. D. Griffiths, "A review of underwater detection techniques and their applicability to the landmine problem," Second International Conference on the detection of abandoned land mines, 12–14 October 1998, Edinburgh.
[2] Y. Nagashima, Y. Sudo, J. Masuda, Y. Matsudaira, K. Arita, E. Nagai, "Pulse radar method and apparatus for detecting an object," U.S. Pat. No. 4,896,116, Jan. 23, 1990.
[3] J. D. Mc Neill, "Method for detecting buried high conductivity objects including scaling of voltages for eliminating noise of a particular depth," U.S. Pat. No. 5,654,637, Aug. 5, 1997.
[4] G. Keller, "Non obtrusive weapon detection system and other metal object," World Patent WO 98/08106, February 1998.
[5] P. Elliot, "Airborne transient electromagnetic method with ground loops," World Patent WO 92/19989, November 1992.
[6] A. Taflove. Computational Electrodynamics. The Finite-Difference Time-Domain method. Artech House, Boston, 1995.
[7] O. Biro, K. Preis, "On the use of magnetic vector potential in the finite element analysis of three-dimensional eddy currents," IEEE Trans. Magn., vol. 25, no. 4, pp. 3145–3159, July 1989.
[8] D. Euvrard, "Résolution numérique des équations aux dérivées partielles; différences finies, éléments finis, méthode des singularités," Masson, 1990.
[9] M. Abramovitz, I. Stegun, "Handbook of mathematical functions," Dower Publications Inc., 1964.
[10] Flux-Expert, registered trademark of SIMULOG, 60 rue Lavoisier, 38330 Montbonnot St. Martin, France.

What is claimed is:

1. A process for detection and localization of electrically-conducting objects buried in the ground, the process involving sending a series of electromagnetic pulses to a medium to be explored by means of a transmitting antenna having at least one loop, and comparing the return signal received by a receiving antenna having at least one loop with at least one signal characteristic stored in a database, this process comprising:

forming a database of at least one signal characteristic, wherein the characteristics of the signals stored in the database are composed of points in an N-dimension space, N being a whole number greater than 1, the dimensions representing characteristic values of a curve of the decrease in time of the value of the signals received in a phase prior to a search, by a first receiving antenna used for the formation of the database, placed above ground in which an object is buried which has an exterior conducting shape identical or similar to the object sought, for various sizes and depths of the object, after transmission of pulses by a first transmitting antenna for formation of the database;

demarcating a surface which is an envelop of all of the points contained in the database, said surface delimiting a detection volume; and searching for buried objects by:
  periodically recording the numerical values of samples of rank 1, 2, . . . n which together represent a real decreasing curve of a signal received by a detection receiving antenna having the same shape and orientation with respect to the ground as the receiving antenna used to create the database, this signal being received after transmission by a real antenna having the same shape and orientation with respect to the ground as the transmitting antenna used to form the pre-recorded characteristics;
  creating an average decreasing curve of an average signal received by determination of average sample values, each of which represents the average value of the values of samples of the same rank;
  determining the same characteristic values as those recorded in the database on the average decreasing curve;
  situating the point corresponding to the real curve obtained in the N-dimension space of the database; and
  detecting an object if the point of the real curve obtained is within the detection volume, the position and the nature of the object being determined as a function of the neighboring points in space.

2. The process for detection and localization of electrically-conducting objects buried in the ground according to claim 1 further comprising a step of composing the characteristics of the signals stored in the database of groups of numeric data forming a four-, three-, two-, or one-dimensional space, the dimensions representing a reception time, a maximum signal level, the slope of a median linear part, a time constant for the decrease of the decreasing curve over time.

3. A process for detection and localization of electrically-conducting objects buried in the ground, the process involving sending a series of electromagnetic pulses into the medium to be explored by means of a transmitting antenna with at least one loop, and comparing a return signal received on a receiving antenna having at least one loop, with at least one signal characteristic stored in a process database this process comprising:

forming a database of at least one signal characteristic, wherein the characteristics of the signals stored in the database are composed of numeric data which each define, in the temporal domain, the shape of a decreasing curve of a value of the signals received in a phase prior to the search, by a first receiving antenna for formation of the database, placed above ground in which an object is buried and which has an exterior conducting shape identical or similar to an object sought, for various sizes and object depths, after transmission of signals by a first transmitting antenna for formation of the database, and searching for buried objects by:

periodically recording the numerical values for the samples of rank 1, 2 . . . n, together representing a real decreasing curve of a signal received by a detection receiving antenna having the same shape and orientation with respect to the ground as the receiving antenna used to create the database, this signal being received after transmission by a real antenna having the same shape and orientation as the transmitting antenna which was used to form the pre-recorded characteristics;

creating an average decreasing curve of an average signal received by determination of average sample values, each of which represents the average value of the values of samples of the same rank;

calculating a value representing the difference between the real average decreasing curve and each of the decreasing curves of the pre-recorded digital signals;

comparing the smallest of the values representing the difference between the real average decreasing curve and each of the pre-recorded decreasing curves with a threshold value; and detecting if at least one value representing a difference between this average decreasing curve and one of the pre-recorded decreasing curves is below a given threshold, the object and its buried depth being defined as the object of the database which had the minimum difference value.

4. The process for detection and localization according to claim 1, further comprising a step of obtaining the numerical data recorded in the database by prior measurements done in the conditions foreseen for the future detection by burying objects similar to those sought at known positions.

5. The process for detection and localization according to claim 1, further comprising a step of obtaining the numerical data recorded in the database by calculation.

6. The process for detection and localization according to claim 5, further comprising a step of obtaining the numerical data recorded in the database by calculation in the following manner:

starting with a Helmholtz-Maxwell equation;

performing a second order Galerkine projection;

forming an integration coefficient;

numerically evaluating the integration coefficients;

forming a matrix system; and resolving the system by calculation of the inverse matrix by LU-type inversion.

7. The process according to claim 1, wherein the process is to detect conducting objects buried in a sea bed.

* * * * *